United States Patent [19]

Voit et al.

[11] Patent Number: 5,620,076
[45] Date of Patent: Apr. 15, 1997

[54] HYDRAULICALLY ACTUATED CLUTCH RELEASE SYSTEM

[75] Inventors: Herbert Voit; Wolfgang Grosspietsch, both of Schweinfurt; Boleslaw Tulaczko, Niederwerrn, all of Germany

[73] Assignee: Fichtel & Sachs AG, Schweinfurt, Germany

[21] Appl. No.: 400,996

[22] Filed: Mar. 9, 1995

[30] Foreign Application Priority Data

Mar. 9, 1994 [DE] Germany .......................... 44 07 665.7

[51] Int. Cl.$^6$ .............................. F16D 13/75; F16D 25/08
[52] U.S. Cl. ........................ 192/70.25; 192/91 A; 192/98; 192/111 A
[58] Field of Search ................................ 192/85 CA, 98, 192/111 A, 70.25, 91 A

[56] References Cited

U.S. PATENT DOCUMENTS

| | | | |
|---|---|---|---|
| 2,885,049 | 5/1959 | Staadt | 192/111 A X |
| 3,548,989 | 12/1970 | Root | 192/111 A |
| 3,912,058 | 10/1975 | Parkins | 192/111 A |
| 3,942,617 | 3/1976 | Poon | 192/111 A |
| 5,443,143 | 8/1995 | Tobiasz | 192/85 CA |
| 5,456,344 | 10/1995 | Nellums | 192/91 A X |

FOREIGN PATENT DOCUMENTS

| | | |
|---|---|---|
| 2332457 | 6/1977 | France . |
| 2539195 | 7/1984 | France . |
| 2695685 | 3/1994 | France . |
| 3241248 | 5/1984 | Germany . |
| 3806642A1 | 9/1989 | Germany .......................... 192/111 A |
| 9313557 | 12/1993 | Germany . |
| 1544814 | 4/1979 | United Kingdom . |
| 2096262 | 10/1982 | United Kingdom . |
| 9407047 | 3/1994 | WIPO . |

*Primary Examiner*—Richard M. Lorence
*Attorney, Agent, or Firm*—Nils H. Ljungman and Associates

[57] ABSTRACT

A hydraulically actuated clutch release system for a motor vehicle friction clutch, including a piston-cylinder unit oriented concentrically to a transmission input shaft, whereby the cylinder is fastened to the transmission housing, and has the cylinder chamber for the piston between an inner and an outer cylinder shell. The piston itself is guided inside a guide element surrounded by the outer cylinder shell. The outer cylinder shell, next to the guide element, has at least one retaining member which can be brought into contact with the guide element, and through which retaining member the guide element can be secured against participation in the movement of the piston during the engagement and release of the clutch. In this case, when there is a change in the axial position of the piston caused by wear in the friction clutch, the action of the retaining member can be suppressed for a displacement of the guide element.

22 Claims, 5 Drawing Sheets

HYDRAULICALLY ACTUATED CLUTCH RELEASE SYSTEM

BACKGROUND OF THE INVENTION

1. Field of the Invention

The present invention generally relates to a hydraulically actuated clutch release system for a motor vehicle friction clutch, including a piston-cylinder unit oriented concentrically to a transmission input shaft, whereby the cylinder of the piston-cylinder unit is fastened to the transmission housing, and between an inner and outer cylinder shell has the cylinder chamber for the piston, the shell of which is at least partly surrounded by a guide element.

2. Background Information

German Utility Model No. 93 13 557 discloses a clutch release system such as that described immediately above. Fastened to the piston of this clutch release system is a guide element which surrounds the piston, and which guides the piston in a sealed manner with respect to the external cylinder shell. Therefore, the guide element must essentially project in the axial direction a sufficient distance beyond the piston, so that this sealed connection can also remain reliably effective when the piston of a new friction clutch travels by, or over, its maximal extension out of the cylinder chamber.

Starting from this first extreme position, the piston executes a stroke into the cylinder chamber to engage the friction clutch. When there is wear in the friction clutch, accompanied by the corresponding action of the application spring of the friction clutch, the piston is also pushed deeper into the cylinder chamber, until the piston finally reaches a second extreme position. In the second extreme position, when the friction clutch is completely worn, the piston has reached its maximum depth of insertion into the cylinder chamber.

Because the length of the guide element is specified, or dictated, by addition, or superposition, of the stroke and wear travel of the piston, when determining the dimensions of the cylinder chamber in the axial direction, either the stroke distance of the piston must essentially be limited or a ring-like axial recess must essentially be formed on the cylinder housing radially outside a rotary shaft lip seal, into which recess the guide element can be inserted. The first-named measure, namely a limitation of the stroke distance of the piston, is usually not possible, since the stroke distance is specified as, or dictated by, a function of the design and layout of the friction clutch. The creation of a ring-like recess, as specified or dictated by the second measure can often be impossible in motor vehicles, in which, as a result of the design, there is essentially no space available for such a recess. Consequently, this known clutch release system can be unsuitable if a long piston stroke is demanded in a motor vehicle, where there is generally not much space available.

OBJECT OF THE INVENTION

An object of the present invention is to create a clutch release system so that the greatest possible stroke length is available for the piston, with the least possible extension in the axial direction.

SUMMARY OF THE INVENTION

The present invention teaches that the above object can be achieved, in accordance with at least one preferred embodiment, by an arrangement wherein the cylinder shell adjacent to the guide element has at least one retaining means which can be brought into engagement with the guide element, by means of which the guide element can be secured against participation in the movement of the piston during the engagement and release of the clutch, whereby by means of the piston, when there is an axial displacement of the piston caused by wear of the friction clutch, the action of the retaining means can be suppressed to allow a displacement movement of the guide element.

As a result of the retaining means for the guide element, the guide element can essentially be active as a stationary component during insertion and extension of the piston, and is essentially only forced to execute an axial movement if, when there is wear to, on, or of the friction linings of the friction clutch, the piston, being released from its stroke travel, is essentially pushed by the application spring of the friction clutch deeper into the cylinder chamber. In this manner, the piston essentially neutralizes the action of the retaining means and pushes the guide element further by an axial distance, the length of which axial distance can essentially be a function of the wear of the friction clutch.

Starting from this neutral axial position of the guide element, the piston then can essentially continue its insertion and extension movement, whereby its stroke distance is essentially displaced in the axial direction compared to that of a new clutch. On account of the relationship between these movements of the two cylinder elements, namely the piston and guide element, which are radially offset from one another and can be telescoped into one another, the piston can essentially execute its stroke movement along the inside of the guide element, while the guide element, for its part, essentially travels a distance along its outside when there is wear to, on, or of the friction clutch with respect to the outer cylinder shell, which travel distance, at the maximum, equals the total wear distance.

The result can essentially be a superimposition of the travel of the piston with the wear travel over which the piston moves, the wear travel being radially offset in relation to the piston travel, so that the total travel in the clutch release system, which includes the stroke and the wear travel, is essentially shorter than the arithmetic sum of these two travels by the overlap obtained by the superimposition. Accordingly, the guide element can be designed shorter, so that it takes up comparatively less space in the axial direction of the cylinder chamber. Consequently, long stroke travels can be executed by the piston while maintaining compact external dimensions of the clutch release system.

The retaining means can be engaged with the guide element in a variety of ways, such as by a fin which runs perpendicular to the axial direction and which is engaged with an identical fin on the guide element, so that when a predetermined axial force is exerted, a relative movement of the guide element with respect to the corresponding cylinder shell is made possible. Likewise, it is conceivable to provide retaining means which, when there is a positive engagement in a recess of the guide element, can be released from this recess, e.g. by the action of an additional actuator, to execute an adjustment process in the event of wear.

Disclosed herebelow in accordance with a preferred embodiment of the present invention is a particularly simple design, according to which there is a non-positive connection between the retaining means and the guide element. The force, which secures the guide element against an axial movement, to prevent the guide element from accompanying the extension and insertion movements of the piston, is greater than the axial force exerted by the application spring of the friction clutch on the piston in the event of wear, and as also disclosed herebelow in accordance with a preferred embodiment of the present invention. This force essentially only decreases in the unpressurized state, i.e. after the conclusion of an insertion movement of the piston under the axial force. A particularly advantageous embodiment for a non-positive, or force-fit, or force-fitting, retaining means is disclosed herebelow, whereby, the radial force which effects the non-positive connection during the extension and insertion of the piston out of or into the cylinder chamber can be greater than when the cylinder is unpressurized. This can be accomplished because, when the cylinder is unpressurized, essentially the only effective force is the prestress of the seal, while during the extension and insertion, the seal can, in addition to the prestress, also be pressurized by the pressure medium, such that it is pressed more strongly against the guide element.

This method, in addition to preventing the movement of the guide element during the extension and insertion of the piston, can also be highly desirable for the reason indicated below: During the inflow of pressure medium into the cylinder chamber, not only the piston, but also the guide element is essentially pressurized with a force in the axial direction. If the latter, under the action of the pressure medium, were to be displaced in the axial direction, the active surface area of the pressure medium would essentially be increased by the active surface, or working surface, of the guide element, which would result in an increase of the clutch release force. Consequently, on account of the greater volume in the cylinder chamber, the stroke travel of the piston would be shortened, since the pressure medium should essentially be introduced into the cylinder chamber in a precisely measured amount for a defined piston stroke. For this reason, it is highly desirable to prevent the guide element from accompanying the piston during the insertion and extension movements of the latter, which means that precisely during this critical movement of the piston, a greater force is generated between the seal and the guide element.

Also disclosed herebelow are solutions which are designed to prevent, on one hand, the escape of pressure medium between the inner wall of the guide element and the piston, and on the other hand the entry of dust. The discharge of pressure medium can be prevented by the pressure medium seal disclosed herebelow, and the penetration of dust can be prevented by the wiper disclosed herebelow.

Also disclosed herebelow is a stop, by means of which the piston can be secured in the axial direction against escaping from the guide element. On the other hand, also disclosed herebelow is a second stop which, as indicated herebelow, can prevent a release of the guide element from the cylinder housing in the axial direction, while as disclosed herebelow, the second stop can have a radial shoulder, with which the piston can come into contact when it is fully inserted into the cylinder chamber. In particular, when the clutch release system is new, one purpose of this shoulder can be to support the piston when a vacuum is produced in the cylinder chamber, before the cylinder chamber is filled with pressure medium against the suction force exerted by the vacuum on the piston.

The bearing ring disclosed herebelow, used to locate the clutch release bearing, can preferably be designed so that it locates the piston with an axial projection of the bearing ring. The bearing ring can be inserted into the guide element, while the flange-like part of the bearing ring which extends radially outward can be used as a limit stop for the piston when the piston travels over the guide element after an insertion movement. Disclosed herebelow is a manner in which this bearing ring can be clamped securely to the piston by means of a securing element in the axial direction. The securing element, a refinement of which is disclosed herebelow, can be connected in a simple manner to the piston, and, when configured as further disclosed herebelow, can have the additional function of locating a wiper which prevents the penetration of dust between the piston and the inner cylinder shell. Disclosed herebelow is an additional advantageous configuration of this securing element, according to which configuration its radially expanded portion can interact with a corresponding shoulder on the clutch release bearing as a contactless gap seal.

Also disclosed herebelow is a design measure, by means of which the external dimensions of the clutch release system can be reduced in the axial direction while maintaining the same piston stroke length, in which the cylinder housing, on its end facing away from the front side of the piston, can have a ring-shaped axial recess for the insertion of the guide element. The guide element, which can essentially only move along, or over, a distance corresponding to the total wear of the friction clutch, can be moved into this recess.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

In summary, one aspect of the invention resides broadly in a hydraulically operated clutch assembly for a motor vehicle, the clutch assembly comprising: a flywheel defining an axis of rotation and an axial direction parallel to the axis of rotation; a clutch disc; a pressure plate for applying an axially directed force to the clutch disc, with respect to the axis of rotation of the flywheel, to engage the clutch disc with the flywheel; the clutch disc being disposed between the flywheel and the pressure plate; the clutch disc comprising friction lining means for contacting the pressure plate and the flywheel during engagement of the clutch disc with the flywheel; means for hydraulically actuating the clutch disc; the hydraulic actuating means comprising: cylinder means, the cylinder means having a first end and a second end, the cylinder means defining a chamber therein, at least a portion of the chamber having hydraulic fluid therein; piston means being disposed within the chamber; the piston means being axially displaceable with respect to the cylinder means; first means for operatively connecting the pressure plate to one of: the cylinder means and the piston means; means for providing hydraulic fluid into and out of the chamber; pedal means for applying pressure to the hydraulic fluid within the chamber to operate the pressure plate to apply the axially directed force, at least a portion of the pedal means being disposed in a passenger compartment of a motor vehicle; second means for operatively connecting the pedal means to the other one of: the cylinder means and the piston means; means for guiding the axial displacement of the piston means; and means for permitting axial displacement of the guiding means upon wear of at least a portion of the friction lining means.

Another aspect of the invention resides broadly in a piston-cylinder arrangement for a hydraulic system in a motor vehicle, the piston-cylinder arrangement comprising: hydraulic actuating means; the hydraulic actuating means comprising: cylinder means, the cylinder means having a first end and a second end, the cylinder means defining a chamber therein, at least a portion of the chamber having hydraulic fluid therein; piston means being disposed within the chamber; the piston means being axially displaceable with respect to the cylinder means; first means for operatively connecting one of: the cylinder means and the piston means to a pressure plate of a motor vehicle clutch assembly; means for providing hydraulic fluid into and out of the chamber; second means for operatively connecting the other of: the cylinder means and the piston means to a pedal arrangement of a motor vehicle clutch assembly; means for guiding the axial displacement of the piston means; and means for permitting axial displacement of the guiding means upon wear of at least a portion of the friction lining means.

BRIEF DESCRIPTION OF THE DRAWINGS

Preferred embodiments of the invention are schematically illustrated in the accompanying drawings, wherein.

DESCRIPTION OF THE PREFERRED EMBODIMENT

Figure 1:
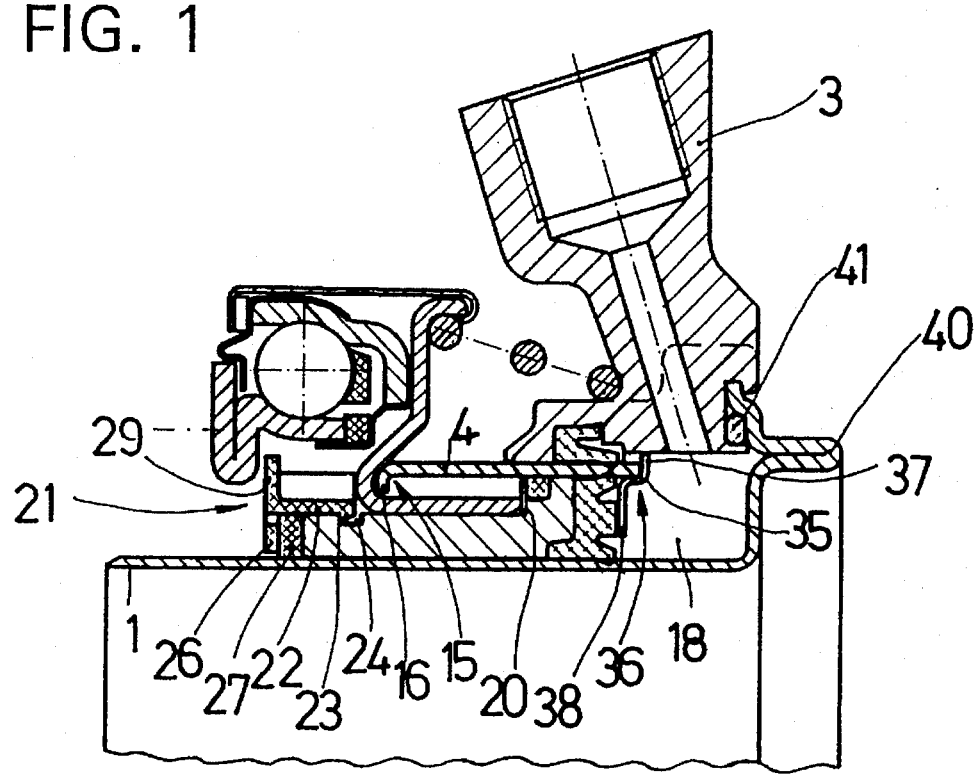
FIG. 1 shows a longitudinal section through a hydraulically actuated clutch release system having a fastening flange on its transmission-side end, and shows the insertion position assumed by the piston when the friction clutch is new.
Figure 1A:
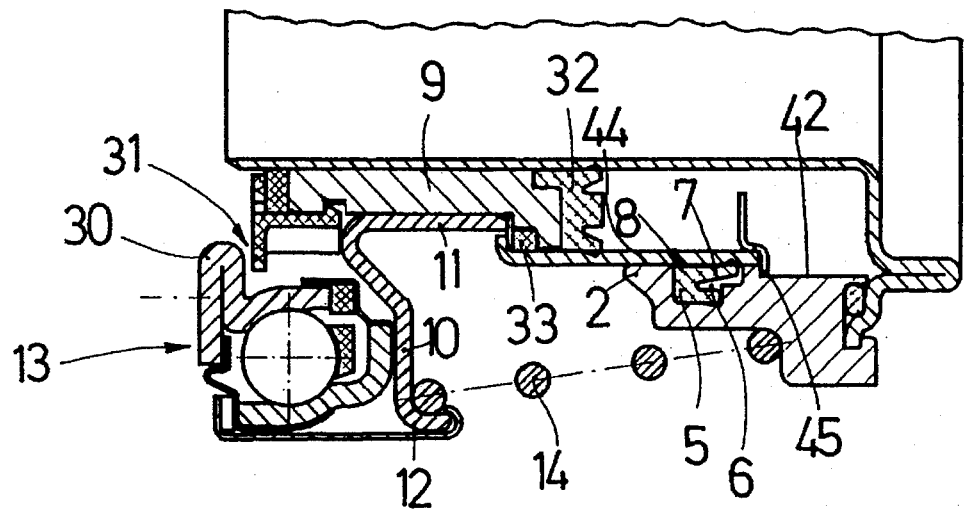
FIG. 1a shows a longitudinal section through a hydraulically actuated clutch release system as shown in FIG. 1, but shows the extension position assumed by the piston when the friction clutch is new.

The hydraulically actuated clutch release system illustrated in FIGS. 1 and 1a preferably includes a cylinder with a radially inner cylinder shell 1 and a radially outer cylinder shell 2, on which outer shell there can be a pressure medium connection 3. The outer cylinder shell 2 preferably has a guide 44 for a sleeve-shaped guide element 4, which guide element 4 can be moved in the axial direction relative to the outer cylinder shell 2. In a depression 6 of the outer cylinder shell 2, there is preferably a seal 5 which, on its side facing the guide element 4, preferably has a seal lip 7 which extends toward the pressure medium connection 3. This seal 5 can be pressed by means of the seal lip 7, which seal lip is preferably radially prestressed, against the guide element 4, and thus can represent a non-positive, tensionally connected, or force-locking connection between the outer cylinder shell 2 and the guide element 4. On account of its function, the seal 5 can essentially act as a retaining means 8 for the guide element 4.

The guide element 4 is preferably used to guide the piston 9, which can be moved for the release and engagement of the clutch in the axial direction relative to the guide element 4 and relative to the inner cylinder shell 1. The piston 9 preferably supports a bearing ring 10, which bearing ring preferably has an axial projection 11 running radially inside the guide element 4 and parallel to the same. Also on the bearing ring 10, there is preferably a flange-like part 12 which runs radially outward, away from the axial projection 11. A clutch release bearing 13 is preferably fastened to the flange-like part 12, on the side of the flange-like part 12 facing away from the piston 9, while on the side of the flange-like part 12 facing the piston 9, a prestress spring 14 is preferably engaged. Prestress spring 14 is preferably supported on its opposite end on the outer housing shell 2, and is preferably used to keep the clutch release bearing 13 in contact with an application spring as found in known friction clutches. Such known friction clutches require no further description here and are disclosed, for example, in German Patent No. 32 41 248 A1.

Figure 2:
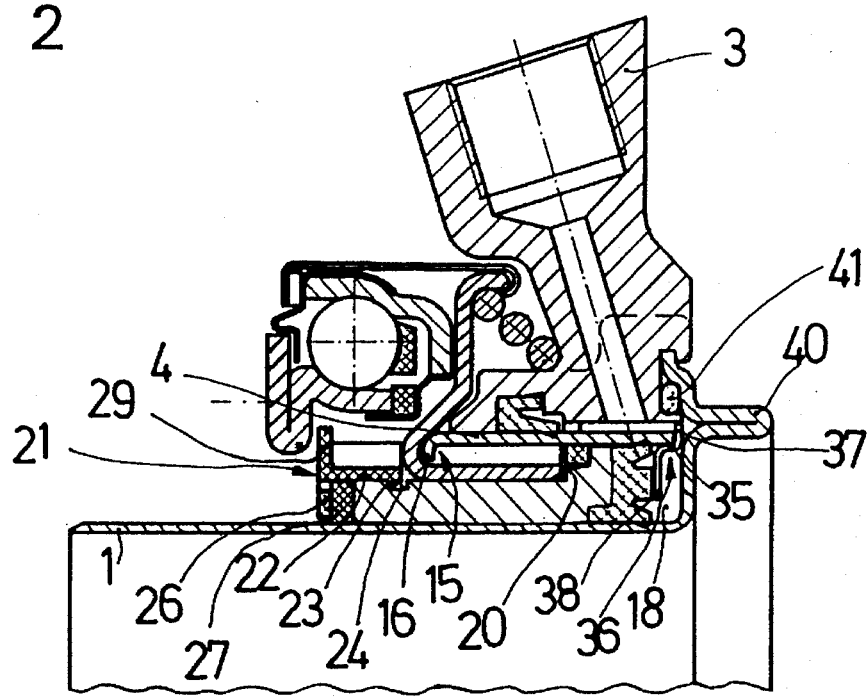
FIG. 2 is essentially the same as FIG. 1, but shows the insertion positions of the piston at the end of wear.
Figure 2A:
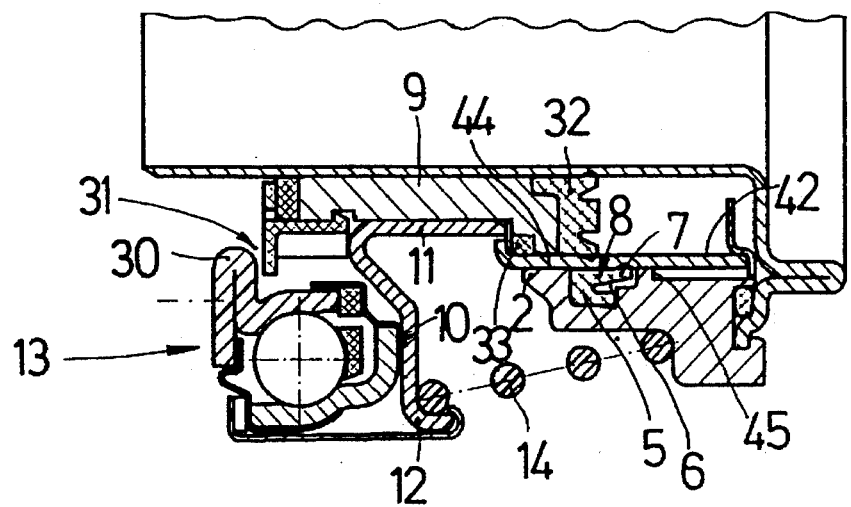
FIG. 2a shows the piston of FIG. 2, but in the extension position at the end of wear.
Figures 3, 3A:
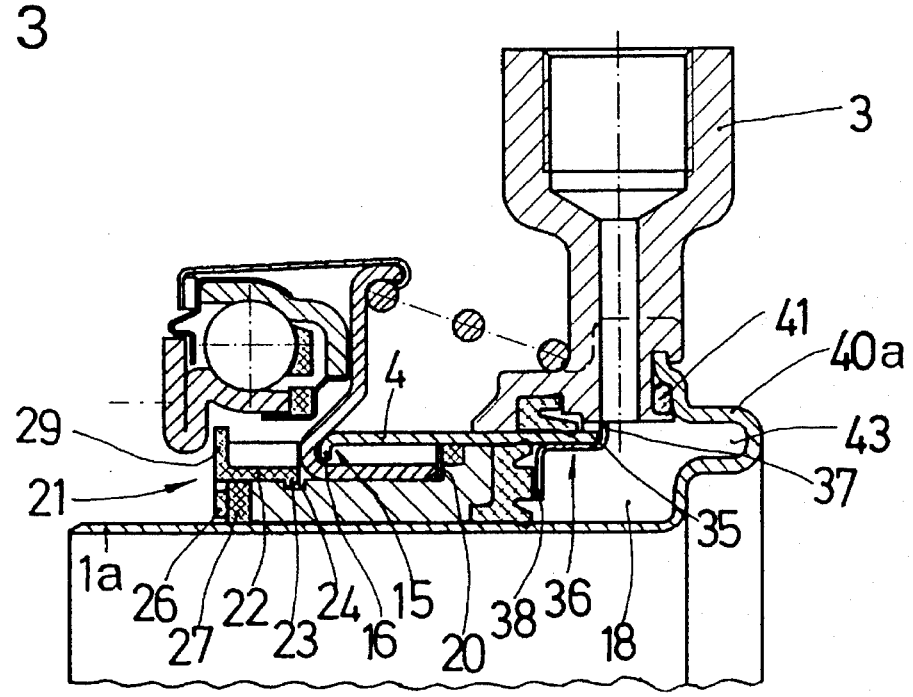
FIG. 3 is essentially the same as FIG. 1, but shows a fastening flange which has an axial recess and shows the insertion position of the piston when the friction clutch is new.
FIG. 3a shows the piston of FIG. 3, but in the extension position.

The guide element 4 preferably comes into contact with a bend 16 also on the side of the part 12 of the bearing ring 10 which supports the spring 14, which bend 16 preferably acts as a stop 15 radially inwardly, if the piston 9, as shown respectively in the upper halves of FIGS. 1 and 2, is inserted into the cylinder chamber 18 enclosed by, defined between, or formed between, the outer and inner cylinder shell.

During assembly, the bearing ring 10 is preferably pushed onto the piston 9 in the axial direction, and preferably comes into contact with a projection 20 on the piston 9. To secure the bearing ring 10 against a reverse movement back off of the piston 9, on the axially opposite end of the bearing ring 10, there is preferably a securing element 21 which is designed with an axial projection 22 which, on its free end, preferably has a lug 23 which snaps elastically into a corresponding recess 24 in the piston 9. The securing element 21 is preferably ring-shaped and preferably has a number of radial contractions 26, which, between them and the clutch-side end of the piston 9, preferably hold a wiper 27 for dust. The securing element 21, on its coupling-side end, also preferably has a radial expansion 29, which is preferably moved in the axial direction, to a gap width, toward a shoulder 30 which runs radially inward on, from, or with respect to the clutch release bearing 13. In interaction with this shoulder 30, radial expansion 29 preferably essentially acts as a contactless gap seal 31.

The piston 9 is preferably sealed by means of a seal 32, both with respect to the guide element 4 and with respect to the inner cylinder shell 1, against a discharge of pressure medium out of the cylinder chamber 18. In addition, on the side of the pressure medium seal 32 facing away from the pressure medium, there can also be a wiper 33 which can be designed to prevent the entry of dust. On the pressure medium side of the pressure medium seal 32, fastened to the guide element 4, there is preferably a clamp 35. This clamp 35, by way of a radially outward bend 37, preferably acts as a second stop 36 of the guide element 4. On the clamp 35, there is also preferably a shoulder 38 which extends radially inwardly, with which the pressure medium seal 32 preferably comes into contact when the piston 9 is inserted into the cylinder chamber 18.

The inner cylinder shell 1, with its transmission-side end, on the right in FIGS. 1, 1a, 2 and 2a preferably surrounds a transmission shaft (not shown), and preferably has a fastening flange 40, which can be used to surround a gasket located on the transmission shaft. The inner cylinder shell 1 can preferably be connected to the outer cylinder shell 2 essentially by the interposition of a wiper 41.

The clutch release system can preferably operate as follows, in accordance with a preferred embodiment of the present invention:

When a clutch release system according to at least one preferred embodiment of the present invention is combined with a new friction clutch, the piston 9 will essentially always preferably assume one of the two limit positions illustrated in FIG. 1 and 1a. FIG. 1 shows the engaged position, in which the piston is inserted into the cylinder chamber 18, while FIG. 1a shows the position in which the piston 9 is extended for release. A comparison of FIGS. 1 and 1a shows that, during this insertion or extension movement of the piston 9, the guide element 4 essentially does not change its position inside the cylinder. That is accomplished because, by means of the seal 5, the seal lip 7 of which, as noted above, is preferably prestressed in the radial direction, a non-positive, or force-locking, connection can be created between the outer cylinder shell 2 and the guide element 4, whereby as a result of this non-positive, or force-fitting, connection, the guide element 4 is essentially prevented from following the piston 9 as the latter is inserted or extended.

The seal lip 7 thereby essentially projects toward the pressure medium connection 3, which means that, during an extension of the piston 9, the seal lip 7 can essentially be pressurized from radially outside by the pressure medium which is producing the extension process, so that the seal lip 7 can be pressed against the guide element 4 with a force which is essentially several times greater than the radial prestress. It can thereby essentially be guaranteed that the guide element 4, in spite of the pressure medium acting on its end facing the pressure medium connection 3, does not change its position relative to the outer cylinder shell 2, and thus the volume of the cylinder chamber 18 can essentially be considered as being kept constant. When the piston 9 is inserted, the seal lip 7 is also essentially pressurized, namely by the pressure medium which is expelled from the cylinder chamber 18 by the piston 9 during the insertion movement of the piston 9.

When pressurized by pressure medium, the piston 9 can essentially be extended out of the cylinder chamber 18, until it comes to a stop against the first stop 15 by way of its radial projection 20, the radial projection 20 preferably being guided on the inside of the guide element 4. As a result of this stop, or even stopping action, there can consequently essentially be a limitation of the extension of the piston 9. The piston then can essentially assume the position illustrated in FIG. 1a.

On a typical friction clutch, e.g. like the one disclosed in German Patent No. 32 41 248 A1, wear can essentially occur between the application plate and the friction linings, as a result of which the position of the application spring (that is, the application spring which generates the application force) inside the clutch housing essentially changes. On friction clutches in which this change in the position of the application spring generates a pressure on the clutch release bearing 13 toward the transmission-side end of the cylinder, an axial force can essentially be exerted on the guide element 4 by means of the clutch release bearing 13 and the bearing ring 10, which axial force can be greater than that force which is exerted on the guide element 4 by the seal 5 acting as the retaining means 8 holding the guide element 4 stationary, when, in an unpressurized state of the cylinder, the seal lip 7 acts on the guide element 4 essentially only by way of its radial prestress. The result of this arrangement can be that, as a result of the axial force introduced by means of the clutch release bearing 13, when the cylinder is unpressurized, the guide element 4 can essentially be displaced toward the transmission-side end of the cylinder, until the change in the position of the application spring of the friction clutch caused by wear is compensated for. As soon as a new equilibrium of forces has been established, the guide element 4 can essentially come to a stop. Starting from this new position of the guide element 4, the piston 9 now can essentially execute its insertion and extension movement with the customary piston stroke. During further operation of the clutch release system, as a result of progressive wear on the friction clutch, the guide element 4 can essentially be displaced increasingly toward the transmission-side end of the cylinder, until the guide element 4 has essentially reached its limit position illustrated in FIGS. 2 and 2a. Even in this position of the guide element 4, the piston 9 can essentially execute its customary piston stroke.

In conclusion, it should be noted that the clamp 35 fastened to the free end of the guide element 4 can essentially be thought of as having at least the following functions:

As a result of its bend 37 directed radially outward, clamp 35 can essentially acts as a second stop 36 which, when the friction clutch illustrated in FIGS. 1 and 1a is new, is essentially supported on a radial shoulder 45 of the outer cylinder shell 2, and thus essentially prevents the guide element 4 from being ejected from the cylinder shell 2. As the wear increases in the friction clutch, this second stop 36 preferably moves, in the guide 42 in the cylinder shell 2 provided for that purpose, toward the transmission-side end of guide 42. The shoulder 38 of the clamp 35 can preferably be active exclusively during the charging of the cylinder with pressure medium, a process which can be explained as follows:

Before charging the cylinder with pressure medium, a vacuum can generally be created in the cylinder chamber 18, as a result of which the piston 9 can essentially be pulled into the cylinder chamber 18, where it preferably comes into contact against the stop 38. When this process has been concluded, the pressure medium can then essentially be easily charged into the cylinder. Any air bubbles which may still be present can essentially be removed by means of a ventilation line (not shown).

As a result of the presence of the fastening flange 40, the cylinder can essentially have a radial guide for insertion into the transmission housing (not shown). Such a configuration of the fastening flange can be used in particular when, radially inside the fastening flange, there is to be a particularly large rotary shaft lip seal located on the transmission shaft.

A particularly advantageous embodiment of the clutch release system is illustrated in FIGS. 3, 3a, 4 and 4a, for applications in which only a small rotary shaft lip seal may be required. In that case, the fastening flange 40a of the inner shell 1a can preferably be provided with an inner, ring-shaped recess 43 which runs in the axial direction, which is preferably available for the insertion of the guide element 4 over the distance the guide element travels when the clutch is worn. With such a configuration of the fastening flange 40a, and compared to the clutch release system illustrated in FIGS. 1, 1a, 2 and 2a, either the piston travel can be increased during the insertion and extension, or with a piston travel comparable to FIGS. 1, 1a, 2 and 2a, the clutch release system can be made even shorter in the axial direction. In this embodiment, therefore, the ratio between the piston travel and the axial length of the clutch release system can essentially reach an optimum.

Figure 4:
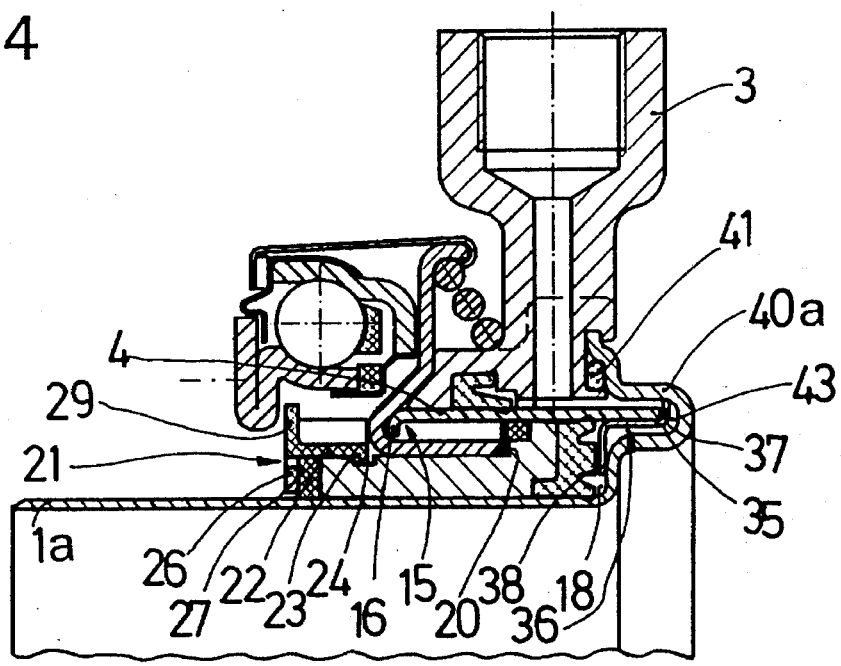
FIG. 4 essentially the same as FIG. 2, but shows the fastening flange illustrated in FIG. 3 and shows the insertion position of the piston at the end of wear.
Figure 4A:
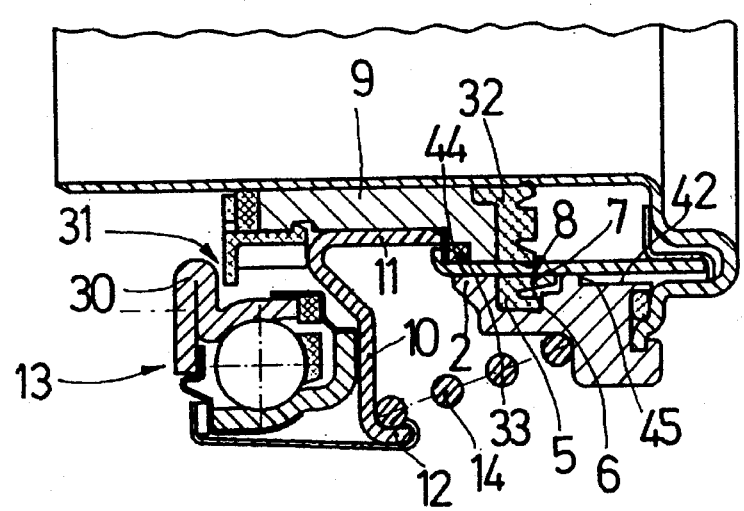
FIG. 4a shows the piston of FIG. 4, but in the extension position.

Compared to, or similarly to, FIGS. 1, 1a, 2 and 2a, FIG. 3 and 3a can be considered as illustrating the clutch release system on a new friction clutch, and FIG. 4 and 4a can be considered as illustrating the clutch release system on a used friction clutch.

Generally, processes of charging a cylinder will be well-known to those of ordinary skill in the art and would thus not appear to warrant any further description herein.

The disclosure now turns to a description of a clutch arrangement, having components which may be utilized in accordance with the embodiments of the present invention. It should be understood that components discussed herebelow with relation to FIG. 5 may, if appropriate, be considered to be interchangeable with similar components described hereinabove with relation to FIGS. 1–4a.

Figure 5:
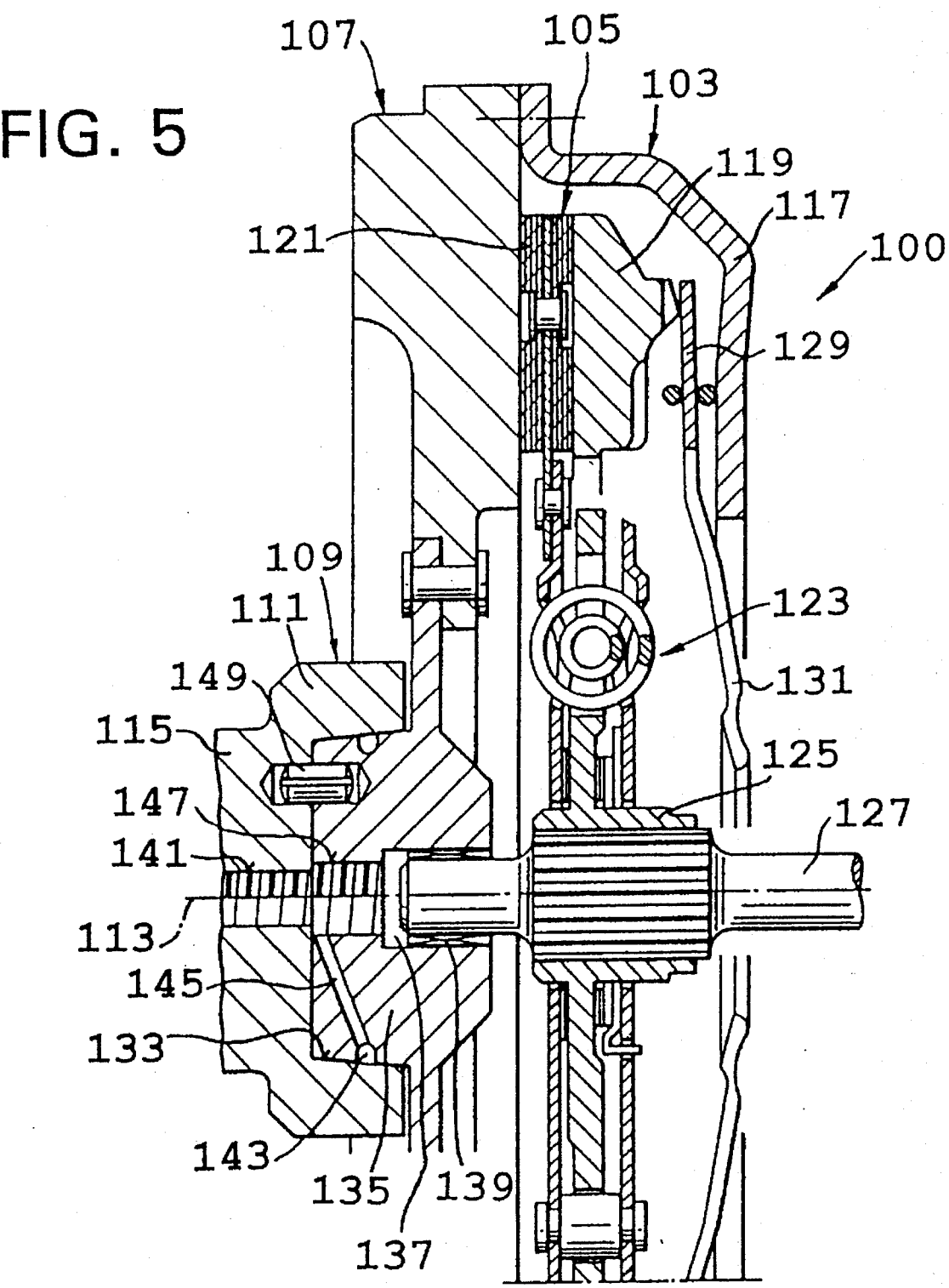
FIG. 5 shows a partial axial longitudinal section through a clutch assembly fastened to a crankshaft of an engine of a motor vehicle.

FIG. 5 shows a motor vehicle friction clutch 100 with which the present invention could be utilized. It should be understood that the components found hereinbelow can be considered as being interchangeable with any similar components discussed hereinabove. The friction clutch 100 shown in FIG. 5 can generally include a pressure plate unit, designated 103 in general, a clutch disc 105 and a flywheel 107. The friction clutch 100 can preferably be mounted by means of a fastening system 109, preferably on the output end 111 of a crankshaft 115 which crankshaft 115 can rotate around an axis of rotation 113 on an internal combustion engine (not shown) of the motor vehicle.

The pressure plate unit 103, in a manner which is well known in the art, can have a clutch housing 117 which clutch housing 117 can be fixed to the flywheel 107 for example by welding, so that the clutch housing 117 can be detached, but preferably does not detach during operation. An essentially disc-shaped application plate or pressure plate 119 can be mounted on the clutch housing 117. The application plate 19" can be mounted by means of tangential leaf springs, for example, which tangential leaf springs are not illustrated in any additional detail, but which tangential leaf springs may be disclosed in U.S. Pat. No. 4,757,597 to Kohler on Jul. 19, 1988, entitled "Method of Assembling a Friction Clutch", and U.S. Pat. No. 4,640,398 to Kolb et al. on Feb. 3, 1987, entitled "Friction Clutch with Tangential Leaf Springs". The application plate 119 can be mounted by means of tangential leaf springs so that the application plate 119 essentially does not rotate, but can preferably move axially.

Preferably between the application plate 119 and the flywheel 107 there can be friction linings 21" of the clutch disc 105 which friction linings 121 can be connected to a hub 125 of the clutch disc 105 in a manner well known in the art, such as by means of a torsional vibration damper 123, preferably in a rotationally elastic manner. The clutch disc 105 can be guided preferably by means of the hub 125 in an essentially non-rotating, but axially movable manner on an input shaft 127 of a transmission. The input shaft 127 can preferably be disposed downstream of the friction clutch 100 in the torque transmission path. A membrane spring 129, preferably held in the clutch housing 117, can apply pressure to the application plate 119, and the friction lining 121 can hold the application plate 119 in a friction-tight manner preferably against the flywheel 107. A disconnecting lever (not shown here) can act on the flexible tongues 131 preferably of the membrane spring 129, whereby the load on the application plate 119 can be relieved and the clutch 100 can be disconnected or disengaged. Types of disconnecting or disengaging levers may be disclosed in U.S. Pat. No. 4,751,990 to Schraut et al. on Jun. 21, 1988, entitled "Multi-disc Clutch Unit, Particularly for Heavy Duty Motor Vehicles", and U.S. Pat. No. 4,238,018 to Maucher on Dec. 9, 1980, entitled "Disengaging Unit for Drawing Disengagable Friction Clutches".

The output end 111 of the crankshaft can preferably contain a central opening 133 in the face of the crankshaft 115, the inner jacket or surface of which opening 133 can form a taper surface which can taper axially into the crankshaft 115. A conical extension 135 which can project axially from the flywheel 107, can extend into the opening 133 in the end of the crankshaft 115, and the outer jacket of the conical extension 135 can have a taper surface which can essentially match the inner jacket of the opening 133 in the face of the crankshaft 115. The matching taper surfaces of the opening 133 and of the conical extension 135 can form the essentially axial joint surfaces of a radial interference fit, which can radially guide the flywheel 107 on the crankshaft 115, and can transmit the torque from the crankshaft 115 to the clutch 100.

The conical extension 135 can form a hub of the flywheel 107 and can contain a progressively stepped hole 137, which stepped hole 137, can expand radially toward the clutch disc 5". The stepped hole 137, preferably in its expanded portion, can house a pilot bearing 139, preferably for the radial guidance of the crankshaft-side end 115 of the transmission input shaft 127. The face or central opening 133 can continue or extend along the same axis as the stepped hole 137, preferably into a threaded hole 141, into which threaded hole 141 a clamping bolt (not shown) can be screwed through the hub 125, preferably for the assembly of the friction clutch 100, before the insertion of the transmission input shaft 127 into the hub 125. By means of the clamping bolt, which is not illustrated in any further detail and should be removed following assembly, the conical extension 135 can be axially pressed into the opening 133 in the end of the crankshaft 115.

The flywheel 107 can preferably be removed from the crankshaft 115 by means of hydraulically actuated extraction devices, which can preferably act by means of rod-sleeve connections through the hub 125 of the clutch disc 105 to the connection area 109. The conical extension 135 can be provided with threaded connections, for example, in the vicinity of its graduated or stepped hole 137. The extraction of the flywheel 107 from the output end 111 can also possibly be done by hydraulic expansion of the output end 111. For this purpose, there can preferably be a ring-shaped groove 143 on the circumference of the conical extension 135, which ring-shaped groove 143 can be connected by means of one or more radial channels 145, to a central pressure medium connection, e g. designed as a threaded hole 147. The threaded hole 147 may form a part of the stepped hole 137. The pressure medium connection 147 can preferably be connected through the hub 125 of the clutch disc 105 to a hydraulic pressure unit (not shown), which hydraulic pressure unit can hydraulically expand the opening 133 in the end of the crankshaft 115, preferably by means of the closed circular line or groove 143.

The flywheel 107 can be connected relative to the crankshaft 115 by means of an indexing pin 149, which indexing pin 149 can define the angular position of the flywheel 107 relative to the crankshaft 115.

It should be understood that the friction clutch 100 shown in FIG. 5 is presented only by way of example of one type of clutch in which the present invention may be incorporated.

One feature of the invention resides broadly in the hydraulically actuated clutch release system for a motor vehicle friction clutch, consisting of a piston-cylinder unit oriented concentrically to a transmission input shaft, whereby the cylinder of the piston-cylinder unit is fastened to the transmission housing, and between an inner and outer cylinder shell has the cylinder chamber for the piston, the shell of which is at least partly surrounded by a guide element, characterized by the fact that the cylinder shell 2 adjacent to the guide element 4 has at least one retaining means 8 which can be brought into engagement with the guide element 4, by means of which the guide element can be secured against participation in the movement of the piston during the engagement and release of the clutch, whereby by means of the piston 9, when there is an axial displacement of the piston 9 caused by wear of the friction clutch, the action of the retaining means 8 can be suppressed to allow a displacement movement of the guide element 4.

Another feature of the invention resides broadly in the clutch release system characterized by the fact that the retaining means 8 is non-positively connected to the guide element, whereby the force to secure the guide element 4 against a movement with the piston 9 during the engagement and release of the clutch is higher than the axial force exerted on the guide element 4 during the axial displacement of the piston 9 caused by wear.

Yet another feature of the invention resides broadly in the clutch release system characterized by the fact that the force which secures the guide element 4 against an axial movement when the cylinder is unpressurized is less than the axial force exerted on the guide element 4 in the event of an axial displacement of the piston 9 caused by wear.

Still another feature of the invention resides broadly in the clutch release system characterized by the fact that the retaining means 8 are formed by a seal 5 which, in the event of an extension movement of the piston 9 which occurs when the piston 9 is pressurized, or in the event of an insertion movement of the piston 9 which acts against pressure medium being discharged, the guide element 4 is pressurized with a higher force to secure it against an axial movement than when the cylinder is unpressurized.

A further feature of the invention resides broadly in the clutch release system characterized by the fact that the seal 5 has a seal lip 7 which faces the pressure medium connection 3 and can be pressurized by the pressure medium, and which is in contact with the guide element 4.

Another feature of the invention resides broadly in the clutch release system characterized by the fact that the piston 9 is guided in a sealed manner with respect to the guide element 4.

Yet another feature of the invention resides broadly in the clutch release system characterized by the fact that the piston 9 has a pressure medium seal 32, at least in the radially outer region, which seal comes into contact with the guide element 4.

Still another feature of the invention resides broadly in the clutch release system characterized by the fact that the pressure medium seal 32 corresponds to a wiper 33 in contact with the guide element 4.

A further feature of the invention resides broadly in the clutch release system characterized by the fact that the guide element 4, on its piston-side end, has a first stop 15 to limit the extension travel of the piston 9.

Another feature of the invention resides broadly in the clutch release system characterized by the fact that the stop 15 is formed by a bend 16 toward the piston 9, against which the piston 9 can be brought into contact by means of a radial projection 20.

Yet another feature of the invention resides broadly in the clutch release system characterized by the fact that the guide element 4 is provided with a second stop 36 to protect against its expulsion from the cylinder housing, which second stop 36 can be moved in the axial direction in a radial expansion 42 of the external cylinder shell 2 along a path of defined length.

Still another feature of the invention resides broadly in the clutch release characterized by the fact that the second stop 36 is formed by a ring-shaped clamp or strap 35 fastened to the guide element 4, which clamp 35 has a radial shoulder 38 to limit the depth of insertion of the piston 9 into the cylinder chamber 18.

A further feature of the invention resides broadly in the clutch release system characterized by the fact that the piston 9 supports a bearing ring 10 for the clutch release bearing 13, which bearing ring 10 is engaged with an axial projection 11 in the guide element 4, and has an external part 12 which resembles a flange, and by means of which its side facing away from the clutch release bearing 13 comes in contact with the guide element 4.

Another feature of the invention resides broadly in the clutch release system characterized by the fact that the end of the piston 9 which faces the clutch release bearing 13 supports an element 21 which secures the piston 9 against axial movements of the bearing ring 10.

Yet another feature of the invention resides broadly in the clutch release system characterized by the fact that the securing element 21 has an axial projection 22, which can be elastically engaged by means of a radial lug 23 in a recess 24 of the piston 9.

Still another feature of the invention resides broadly in the clutch release system characterized by the fact that the securing element 21, on its end away from the piston 9, has at least one radial contraction 26 to support a wiper 27 located between the contraction 26 and the piston 9.

A further feature of the invention resides broadly in the clutch release system characterized by the fact that the securing element 21 has a radial expansion 29, which extends in the axial direction to the gap width or aperture on a shoulder 30 which runs radially inward on the clutch release bearing 13.

Another feature of the invention resides broadly in the clutch release system with a cylinder housing which, on its side away from the piston, has a fastening flange which encloses a ring-shaped recess which runs axially, characterized by the fact that the guide element 4, during its axial displacement to compensate for the wear to the friction clutch, can be moved into the recess 43.

Examples of ventilation arrangements for use in charging a cylinder, such as bleed valves or bleed nipples or the like, which may be utilized in accordance with the embodiments of the present invention, may be found in the following U.S. Pat. No. 4,785,629, which issued to Ennis, III, et al. on Nov. 22, 1988; U.S. Pat. No. 4,724,938, which issued to Horvath on Feb. 16, 1988; U.S. Pat. No. 4,716,732, which issued to Tordoff on Jan. 5, 1988; and U.S. Pat. No. 4,724,938, which issued to Tordoff on Feb. 16, 1988.

Some examples of clutch assemblies and various components associated therewith which could possibly utilize the present invention, may be disclosed in the following U.S. Patents: U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Some examples of hydraulic clutch systems which could possibly utilize the piston-cylinder arrangement of the present invention are disclosed by the following U.S. Patents, each of which is assigned to the assignee of the present invention: U.S. Pat. No. 5,211,099 to Grosspietsch et al., dated May 18, 1993 and entitled "Slave Cylinder for a Hydraulic Actuating System of a Motor Vehicle Friction Clutch"; U.S. Pat. No. 5,052,279 to Limbacher and Fadler, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch".

Some additional examples of hydraulic and/or pneumatic devices which can possibly utilize the piston-cylinder arrangement of the present invention are disclosed by the following U.S. Patents: U.S Pat. No. 5,092,125 to Leight et al., entitled "Seal"; U.S. Pat. No. 4,635,778 to Lederman, entitled "Fluid-Operated Piston"; U.S. Pat. No. 4,960,188 to Wossner, entitled "Single-Tube Vibration Damper of Variable Damping Force"; U.S. Pat. No. 5,064,030 to Wossner, entitled "Impact Damping Unit"; U.S. Pat. No. 4,599,860 to Parsons, entitled "Liquid Pressure Apparatus"; and U.S. Pat. No. 2,317,601 to Fowler on Mar. 7, 1940, entitled "Pressure Braking System".

Hydraulic braking systems which could also possibly utilize the present invention may be disclosed in the following U.S. Patents: U.S. Pat. No. 4,634,190 to Wupper, entitled "Hydraulic Brake System With Slip Control"; U.S. Pat. No. 4,643,488 to Reinartz, entitled Hydraulic Vehicle Servo Brake"; U.S. Pat. No. 4,643,489 to Reinartz et al., entitled "Hydraulic Brake System With Slip Control"; U.S. Pat. No. 4,656,833 to Belart, entitled "Hydraulic Brake System for Automotive Vehicles"; and U.S. Pat. No. 4,902,077 to Belart et al., entitled "Hydraulic Brake System".

Types of impact dampers for bumpers which could possibly utilize the present invention may be disclosed in the following U.S. Patents: U.S. Pat. No. 4,809,924 to Martens et al., entitled "Hydraulic Bumper"; U.S. Pat. No. 5,096,242 to Chin-Hun, entitled "Shock Absorbing Bumper System"; and U.S. Pat. No. 5,277,462 to Verzelli et al., entitled "High-performance Car Bumper Module".

Types of strut assemblies which could possibly utilize the present invention may be disclosed in the following U.S. Patents: U.S. Pat. No. 4,828,237 to Neff, entitled "Reduced Length MacPherson Strut"; and U.S. Pat. No. 4,861,066 to Dernie, entitled "Vehicle Suspension Strut Systems".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. P 44 07 665.7, filed on Mar. 9, 1994, having inventors Herbert Voit, Wolfgang Grosspietsch, and Boleslaw Tulaczko, and DE-OS P 44 07 665.7 and DE-PS P 44 07 665.7, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed:

1. A piston-cylinder arrangement for a hydraulic system in a motor vehicle, said piston-cylinder arrangement comprising:

hydraulic actuating means;
said hydraulic actuating means comprising:
cylinder means, said cylinder means having a first end and a second end, said cylinder means defining a chamber therein;
at least a portion of said chamber having hydraulic fluid disposed therein;
piston means being disposed within said chamber;
said piston means being axially displaceable with respect to said cylinder means;
means for operatively connecting one of: said cylinder means and said piston means to a pressure plate of a motor vehicle clutch assembly;
means for providing hydraulic fluid into and out of said chamber;
means for guiding the axial displacement of said piston means;
a seal being disposed to seal at least a portion of said chamber from the external environment;
said seal comprising means for retaining said guiding means in a fixed position during pressurization of said cylinder means; and
said seal being configured for permitting movement of said guiding means upon wear of friction linings of a motor vehicle friction clutch when said cylinder means is unpressurized.

2. The piston-cylinder arrangement according to claim 1 wherein:

said cylinder means comprises a cylinder shell at least partially surrounding said guiding means; and
said seal is disposed between said guiding means and said cylinder shell.

3. The piston-cylinder arrangement according to claim 2 wherein said seal is configured for permitting movement of said guiding means upon a given axial displacement of said piston means caused by movement of said means for operatively connecting towards said cylinder means upon wear of friction linings of a motor vehicle friction clutch.

4. The piston-cylinder arrangement according to claim 3 wherein said seal is configured such that, in the event of an extension movement of said piston means out of said cylinder means which occurs when said piston means is pressurized, or in the event of an insertion movement of said piston means into said cylinder means wherein said piston means acts against hydraulic fluid being discharged, said guiding means is pressurized with a higher force for securing said guiding means against an axial movement than when said cylinder means is unpressurized.

5. The piston-cylinder arrangement according to claim 4 wherein:

said means for providing hydraulic fluid comprises a pressure medium connection;

said retaining means of said seal comprises a seal lip facing said pressure medium connection such that said seal lip can be pressurized by hydraulic fluid, said seal lip being in contact with said guiding means; and said seal being connected to said guiding means in a force-fit manner.

6. The piston-cylinder arrangement according to claim 5 wherein:

said piston means has a radially outer region disposed adjacent said guiding means;

said piston means comprises:

a pressure medium seal disposed at said radially outer region of said piston means, said pressure medium seal contacting said guiding means; and a wiper disposed at said radially outer region of said piston means, said wiper contacting said guiding means.

7. The piston-cylinder arrangement according to claim 6 wherein:

said piston means is axially movable out of said cylinder means for disengaging a motor vehicle friction clutch and into said cylinder means for engaging a motor vehicle friction clutch;

said guiding means comprises a guide element having a first end disposed adjacent said pressure medium connection and a second end disposed a distance from said first end; and said second end of said guide element comprising a stop for limiting movement of said piston means out of said cylinder means.

8. The piston-cylinder arrangement according to claim 7 wherein:

said stop of said guide element comprises a bent portion of said second end of said guide element, said bent portion extending radially towards said piston means; and said piston means comprises a projection extending radially towards said guide element, said projection engaging said bent portion to limit movement of said piston means out of said cylinder.

9. The piston-cylinder arrangement according to claim 8 wherein:

said stop is a first stop;

said guide element comprises a second stop for preventing expulsion of said guide element from said cylinder shell;

said cylinder shell comprising a radially expanded portion facing and forming a part of said chamber;

said second stop being movable along said radially expanded portion of said cylinder shell along a path of defined length;

said second stop comprising a ring-shaped clamp fastened to said guide element; and said clamp comprising a shoulder extending radially away from said guide element, said shoulder engaging with said piston means to limit movement of said piston means into said chamber.

10. The piston-cylinder arrangement according to claim 9 wherein:

said piston means is guided in a sealed manner with respect to said guide element;

said piston-cylinder arrangement further comprises a bearing ring and a clutch release bearing both disposed adjacent said second end of said guide element;

said bearing ring comprises an axially projecting portion extending axially along a portion of said guide element and a radially extending portion extending radially towards said guide element and engaging with said guide element;

said bearing ring comprises a flange disposed adjacent said clutch release bearing, said flange having a first side and a second side facing away from one another;

said first side of said flange faces said clutch release bearing and said second side of said flange contacts said bent portion of said guide element;

said piston-cylinder arrangement comprises a securing member disposed adjacent said clutch release bearing;

said securing member is disposed to secure said piston means against axial movements of said bearing ring;

said piston means has a first end disposed adjacent said pressure medium connection and a second end disposed adjacent said clutch release bearing, said second end of said piston means being configured for supporting said securing member;

said securing member comprises an axially extending portion having a lug extending radially towards said piston means;

said piston means comprises a recess, said lug elastically engaging said recess of said piston means;

said securing member comprises a first end and a second end, said first end of said securing member being disposed adjacent said second end of said piston means;

said first end of said securing member is disposed adjacent said lug;

said second end of said securing member comprises a first radially extending portion and a second radially extending portion, said first radially extending portion extending inwardly and away from said axially extending portion of said securing member;

said second radially extending portion extending outwardly and away from said axially extending portion of said securing member;

said wiper is a first wiper;

said piston-cylinder arrangement further comprises a second wiper disposed between said first radially extending portion of said securing member and said piston means;

said clutch release bearing comprises a shoulder extending radially inwardly towards said securing member;

said second radially extending portion of said securing member being disposed immediately adjacent said shoulder of said clutch release bearing; and said cylinder means comprises a cylinder housing having a fastening flange disposed adjacent said pressure medium connection.

11. The piston-cylinder arrangement according to claim 10 wherein said fastening flange is configured to form a ring-shaped axial recess, said guide element being movable into said ring-shaped axial recess during its axial displacement upon wear of friction linings of a motor vehicle friction clutch.

12. A piston-cylinder arrangement for a hydraulic system in a motor vehicle, said piston-cylinder arrangement comprising:

hydraulic actuating means;

said hydraulic actuating means comprising:
cylinder means, said cylinder means having a first end and a second end, said cylinder means defining a chamber therein;
at least a portion of said chamber having hydraulic fluid disposed therein;
piston means being disposed within said chamber;
means for operatively connecting one of: said cylinder means and said piston means to a pressure plate of a motor vehicle clutch assembly;
means for providing hydraulic fluid into and out of said chamber;
means for guiding the axial displacement of said piston means;
said cylinder means comprising a cylinder shell at least partially surrounding said guiding means;
said piston means being axially movable with respect to said cylinder means into an extension movement out of said cylinder means occurring during pressurization of said piston means with hydraulic fluid, and an insertion movement into said cylinder means wherein said piston means acts against hydraulic fluid being discharged from said cylinder means;
means for retaining said guiding means at a fixed position with respect to said cylinder shell during both of said extension and insertion movements of said piston means;
said retaining means being configured for providing a first force to said guiding means during both of said extension and insertion movements of said piston means to maintain said fixed position of said guiding means; and
said retaining means being configured for providing a second force to said guiding means when said cylinder means is unpressurized, said second force permitting axial displacement of said guiding means with respect to said cylinder shell upon wear of friction lining means of a motor vehicle friction clutch, said second force being less than said first force.

13. The piston-cylinder arrangement according to claim 12 wherein said retaining means comprises a seal disposed to seal at least a portion of said chamber from the external environment.

14. The piston-cylinder arrangement according to claim 13 wherein said seal is disposed between said guiding means and said cylinder shell.

15. The piston-cylinder arrangement according to claim 14 wherein said second force of said seal permits axial displacement of said guiding means with respect to said cylinder shell upon a given axial displacement of said piston means caused by movement of said means for operatively connecting towards said cylinder means upon wear of friction linings of a motor vehicle friction clutch.

16. The piston-cylinder arrangement according to claim 15 wherein:
said means for providing hydraulic fluid comprises a pressure medium connection; and
said seal comprises a seal lip facing said pressure medium connection such that said seal lip can be pressurized by hydraulic fluid, said seal lip being in contact with said guiding means.

17. The piston-cylinder arrangement according to claim 16 wherein said piston means is guided in a sealed manner with respect to said guiding means.

18. The piston-cylinder arrangement according to claim 17 wherein:

said piston means has a radially outer region disposed adjacent said guiding means;
said piston means comprises:
a pressure medium seal disposed at said radially outer region of said piston means, said pressure medium seal contacting said guiding means; and
a wiper disposed at said radially outer region of said piston means, said wiper contacting said guiding means.

19. The piston-cylinder arrangement according to claim 18 wherein:
said piston means is axially movable out of said cylinder means for disengaging a motor vehicle friction clutch and into said cylinder means for engaging a motor vehicle friction clutch;
said guiding means comprises a guide element having a first end disposed adjacent said pressure medium connection and a second end disposed a distance from said first end;
said second end of said guide element comprising a stop for limiting movement of said piston means out of said cylinder means;
said stop of said guide element comprises a bent portion of said second end of said guide element, said bent portion extending radially towards said piston means;
said piston means comprises a projection extending radially towards said guide element, said projection engaging said bent portion to limit movement of said piston means out of said cylinder;
said stop is a first stop;
said guide element comprises a second stop for preventing expulsion of said guide element from said cylinder shell;
said cylinder shell comprising a radially expanded portion facing and forming a part of said chamber;
said second stop being movable along said radially expanded portion of said cylinder shell along a path of defined length;
said second stop comprising a ring-shaped clamp fastened to said guide element;
said clamp comprising a shoulder extending radially away from said guide element, said shoulder engaging with said piston means to limit movement of said piston means into said chamber;
said piston-cylinder arrangement further comprises a bearing ring and a clutch release bearing both disposed adjacent said second end of said guide element;
said bearing ring comprises an axially projecting portion extending axially along a portion of said guide element and a radially extending portion extending radially towards said guide element and engaging with said guide element;
said bearing ring comprises a flange disposed adjacent said clutch release bearing, said flange having a first side and a second side facing away from one another;
said first side of said flange faces said clutch release bearing and said second side of said flange contacts said bent portion of said guide element;
said piston-cylinder arrangement comprises a securing member disposed adjacent said clutch release bearing;
said securing member is disposed to secure said piston means against axial movements of said bearing ring;
said piston means has a first end disposed adjacent said pressure medium connection and a second end disposed adjacent said clutch release bearing, said second end of said piston means being configured for supporting said securing member;

said securing member comprises an axially extending portion having a lug extending radially towards said piston means;

said piston means comprises a recess, said lug elastically engaging said recess of said piston means;

said securing member comprises a first end and a second end, said first end of said securing member being disposed adjacent said second end of said piston means;

said first end of said securing member is disposed adjacent said lug;

said second end of said securing member comprises a first radially extending portion and a second radially extending portion, said first radially extending portion extending inwardly and away from said axially extending portion of said securing member;

said second radially extending portion extending outwardly and away from said axially extending portion of said securing member;

said wiper is a first wiper;

said piston-cylinder arrangement further comprises a second wiper disposed between said first radially extending portion of said securing member and said piston means;

said clutch release bearing comprises a shoulder extending radially inwardly towards said securing member;

said second radially extending portion of said securing member being disposed immediately adjacent said shoulder of said clutch release bearing; and said cylinder means comprises a cylinder housing having a fastening flange disposed adjacent said pressure medium connection.

20. The piston-cylinder arrangement according to claim 19 wherein said fastening flange is configured to form a ring-shaped axial recess, said guide element being movable into said ring-shaped axial recess during its axial displacement upon wear of friction linings of a motor vehicle friction clutch.

21. A hydraulically operated clutch assembly for a motor vehicle, said clutch assembly comprising:

a flywheel defining an axis of rotation and an axial direction parallel to the axis of rotation;

a clutch disc;

a pressure plate for applying an axially directed force to said clutch disc, with respect to said axis of rotation of said flywheel, to engage said clutch disc with said flywheel;

said clutch disc being disposed between said flywheel and said pressure plate;

said clutch disc comprising friction lining means for contacting said pressure plate and said flywheel during engagement of said clutch disc with said flywheel;

means for hydraulically actuating said clutch disc;

said hydraulic actuating means comprising:

cylinder means, said cylinder means having a first end and a second end, said cylinder means defining a chamber therein;

at least a portion of said chamber having hydraulic fluid disposed therein;

piston means being disposed within said chamber;

means for operatively connecting said pressure plate to one of: said cylinder means and said piston means;

means for providing hydraulic fluid into and out of said chamber;

means for guiding the axial displacement of said piston means;

said cylinder means comprising a cylinder shell at least partially surrounding said guiding means;

said piston means being axially movable with respect to said cylinder means into an extension movement out of said cylinder means occurring during pressurization of said piston means with hydraulic fluid, and an insertion movement into said cylinder means wherein said piston means acts against hydraulic fluid being discharged from said cylinder means;

means for retaining said guiding means at a fixed position with respect to said cylinder shell during both of said extension and insertion movements of said piston means;

said retaining means being configured for providing a first force to said guiding means during both of said extension and insertion movements of said piston means to maintain said fixed position of said guiding means; and said retaining means being configured for providing a second force to said guiding means when said cylinder means is unpressurized, said second force permitting axial displacement of said guiding means with respect to said cylinder shell upon wear of said friction lining means, said second force being less than said first force.

22. The clutch assembly according to claim 21 wherein said retaining means comprises a seal disposed to seal at least a portion of said chamber from the external environment.

* * * * *

UNITED STATES PATENT AND TRADEMARK OFFICE
CERTIFICATE OF CORRECTION

PATENT NO. : 5,620,076
DATED : April 15, 1997
INVENTOR(S) : Herbert VOIT, Wolfgang GROSSPIETSCH and Boleslaw TULACZKO It is certified that error appears in the above-identified patent and that said Letters Patent is hereby corrected as shown below:

In column 5, line 36, after 'insertion', delete "positions" and insert --position--.

In column 7, line 17, after 'in', delete "FIG." and insert --FIGS.--.

In column 9, line 11, after '2a,' delete "FIG." and insert --FIGS.--.

In column 9, line 13, after 'and', delete "FIG." and insert --FIGS.--.

In column 9, line 57, after 'linings', delete " 21'' " and insert --121--.

In column 15, line 33, Claim 7, after the second occurrence of 'of', delete "-said" and insert --said--.

Signed and Sealed this

Twenty-ninth Day of July, 1997

*Attest:*

BRUCE LEHMAN

*Attesting Officer*      *Commissioner of Patents and Trademarks*